(12) United States Patent
Hasan (10) Patent No.: US 12,251,276 B2
(45) Date of Patent: *Mar. 18, 2025

(54) ADDITIVELY MANUFACTURED DENTURE BASE WITH BRACING BODY

(71) Applicant: DENTSPLY SIRONA Inc., York, PA (US)

(72) Inventor: Md Abu Hasan, York, PA (US)

(73) Assignee: Dentsply Sirona Inc., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/597,063

(22) Filed: Mar. 6, 2024

(65) Prior Publication Data

US 2024/0207025 A1   Jun. 27, 2024

Related U.S. Application Data

(63) Continuation of application No. 16/900,067, filed on Jun. 12, 2020, now Pat. No. 11,944,511.

(60) Provisional application No. 62/862,221, filed on Jun. 17, 2019.

(51) Int. Cl.

| | | |
|---|---|---|
| A61C 13/00 | (2006.01) | |
| A61C 13/01 | (2006.01) | |
| A61C 13/36 | (2006.01) | |
| B29C 64/135 | (2017.01) | |
| B29C 64/35 | (2017.01) | |
| B29C 64/40 | (2017.01) | |
| B33Y 10/00 | (2015.01) | |
| B33Y 80/00 | (2015.01) | |

(52) U.S. Cl.
CPC ...... *A61C 13/0019* (2013.01); *A61C 13/0006* (2013.01); *A61C 13/01* (2013.01); *A61C 13/1016* (2013.01); *B29C 64/35* (2017.08); *B29C 64/40* (2017.08); *B33Y 10/00* (2014.12); *B33Y 80/00* (2014.12); *B29C 64/135* (2017.08)

(58) Field of Classification Search
CPC ........ B23K 9/04; B23P 6/007; A61C 13/0019
See application file for complete search history.

(56) References Cited

U.S. PATENT DOCUMENTS

| | | |
|---|---|---|
| 4,253,828 A | 3/1981 | Coles et al. |
| 9,539,072 B2 | 1/2017 | El-siblani |
| 10,959,810 B2 | 3/2021 | Li et al. |
| 11,944,511 B2 | 4/2024 | Hasan |
| 2006/0110698 A1 | 5/2006 | Robson |
| 2008/0044786 A1 | 2/2008 | Kalili |

(Continued)

FOREIGN PATENT DOCUMENTS

| | | |
|---|---|---|
| EP | 2465465 | 6/2012 |
| WO | 2012041329 | 4/2012 |
| WO | 2016041937 | 3/2016 |

OTHER PUBLICATIONS

"U.S. Appl. No. 16/900,067, Restriction Requirement mailed Jan. 26, 2022", 9 pgs.

(Continued)

*Primary Examiner* — Jacob J Cigna
(74) *Attorney, Agent, or Firm* — SCHWEGMAN LUNDBERG & WOESSNER, P.A.

(57) ABSTRACT

The invention relates to additively manufactured dental devices comprised of a denture base and at least one removable bracing body joined at specific locations to the denture base. The invention also relates to methods of using these additively manufactured dental devices in the fabrication of dental prostheses.

6 Claims, 5 Drawing Sheets

(56) References Cited

U.S. PATENT DOCUMENTS

| | | |
|---|---|---|
| 2014/0170591 A1 | 6/2014 | El-Siblani |
| 2015/0093720 A1 | 4/2015 | Beeby et al. |
| 2016/0081767 A1 | 3/2016 | Metcalf et al. |
| 2016/0324730 A1 | 11/2016 | Lee |
| 2017/0367791 A1 | 12/2017 | Raby et al. |
| 2020/0306017 A1 | 10/2020 | Chavez et al. |
| 2020/0307071 A1 | 10/2020 | Hsu et al. |
| 2020/0390528 A1 | 12/2020 | Hasan |
| 2021/0038346 A1 | 2/2021 | Sandwick et al. |
| 2021/0236238 A1 | 8/2021 | Leeson et al. |

OTHER PUBLICATIONS

"U.S. Appl. No. 16/900,067, Response filed Mar. 28, 2022 to Restriction Requirement mailed Jan. 26, 2022", 11 pgs.

"U.S. Appl. No. 16/900,067, Non Final Office Action mailed May 10, 2022", 19 pgs.

"International Application Serial No. PCT US2020 037450, International Search Report mailed Sep. 18, 2020", 4 pgs.

"International Application Serial No. PCT US2020 037450, Written Opinion mailed Sep. 18, 2020", 5 pgs.

"International Application Serial No. PCT US2020 037450, International Preliminary Report on Patentability mailed Dec. 30, 2021", 7 pgs.

"U.S. Appl. No. 16/900,067, Response filed Sep. 12, 2022 to Non Final Office Action mailed May 10, 2022", 13 pgs.

"U.S. Appl. No. 16/900,067, Final Office Action mailed Oct. 19, 2022", 28 pgs.

"U.S. Appl. No. 16/900,067, Response filed Feb. 20, 2023 to Final Office Action mailed Oct. 19, 2022", 17 pgs.

"U.S. Appl. No. 16/900,067, Non Final Office Action mailed Mar. 24, 2023", 36 pgs.

"U.S. Appl. No. 16/900,067, Response filed Aug. 24, 2023 to Non Final Office Action mailed Mar. 24, 2023", 15 pgs.

"U.S. Appl. No. 16/900,067, Ex Parte Quayle Action mailed Nov. 7, 2023", 6 pgs.

"U.S. Appl. No. 16/900,067, Response filed Nov. 7, 2023 to Ex Parte Quayle Action mailed Nov. 7, 2023", 10 pgs.

"U.S. Appl. No. 16/900,067, Notice of Allowance mailed Dec. 6, 2023", 8 pgs.

ADDITIVELY MANUFACTURED DENTURE BASE WITH BRACING BODY

CROSS-REFERENCE TO RELATED APPLICATIONS

This patent application is a continuation of U.S. application Ser. No. 16/900,067 filed Jun. 12, 2020, which claims the benefit of and priority to U.S. Provisional Application No. 62/862,221 filed Jun. 17, 2019, which are herein incorporated by reference for all purposes.

FIELD OF THE INVENTION

The present invention relates to dental devices and methods to be used in the making of dental prostheses. More specifically, the invention relates to additively manufactured (also known as three-dimensionally printed) dental devices comprised of a denture base and at least one removable bracing body joined at specific locations to the denture base. The invention also relates to methods of using these additively manufactured dental devices in the fabrication of dental prostheses.

BACKGROUND

Denture bases or dental plates have been in widespread use in the prosthetic dentistry. These denture bases or plates play a vital role in maintaining a secure position and alignment of artificial teeth in removable and fixed dentures to satisfy the dental restoration needs of partially and/or fully-edentulous patients. The final size and particular shape of a denture base, including the dental arch form and tooth sockets formed for holding artificial teeth within the denture base, are made to patient-specific needs. The specific size and shape parameters may be determined from physical impressions or molds taken of the patient's intra-oral jaw structure (upper and/or lower jaw depending on what is needed), intra-oral imaging, extra-oral imaging, or some combination thereof.

Denture bases have been formed from a variety of durable materials, but polymeric resin compositions have been found to be particularly well-suited to this application, owing to their versatile properties (both in manufacturing and in use), biocompatibility, and relative cost-effectiveness. Historically, denture bases made from these compositions traditionally have been produced either by some version of a cast molding process or CNC (computer numerical control) milling process.

For denture bases fabricated using cast molding processes, uncured or partially cured polymeric resin compositions (e.g., in flowable form, liquid or paste-like) may be poured, pressed, or injected into patient-specific pre-formed denture base molds, followed by some application of controlled thermal and/or light treatment to induce final curing/hardening of the composition within the pre-formed mold. In some variants of this process, predetermined artificial teeth can be arranged and secured in advance within the mold so that during the casting process the denture base composition conforms and bonds to the base of each artificial tooth concurrently with the filling and curing steps. In other variants of the casting process, pre-formed tooth sockets may be established in the molded denture base so that the predetermined artificial tooth forms may be subsequently inserted and adhesively bonded to the post-cured molded denture base. Denture bases produced by a version of cast molding generally possess consistent dimensional accuracy and sufficient dimensional integrity through the finishing steps to maintain a proper final fit for the patient. However, among the disadvantages or drawbacks for the cast molding process are the extensive time, labor, and materials required to complete the process.

For denture bases fabricated using CNC milling processes, the general approach has been to use polymeric resin compositions already fully cured in solid form to the shape of circular discs, blanks, or "pucks." Such cured resin discs are provided of sufficient diameter and thickness to accommodate both the height and span of a patient's dental arch. Using CAD/CAM (computer-aided design/computer-aided manufacturing) software with CNC machining tools, dental arch forms with tooth socket compartments can be cut out of these cured resin discs, in a very precise and reliable manner. Following milling of a disc to produce a desired denture base form, predetermined artificial tooth forms are then subsequently inserted into the milled tooth sockets and adhesively bonded to the denture base. Similar to denture bases produced by cast molding, because these resin discs are supplied as pre-formed blanks in fully cured state, denture bases produced by CNC milling generally possess consistent dimensional accuracy and sufficient dimensional integrity through the finishing steps to maintain a proper final fit for the patient. However, the CNC milling process also has several disadvantages or drawbacks in producing denture bases. For one, since this approach requires the machining of large, standardized pre-formed discs (to accommodate full range of small to large patient arch sizes), there are many instances where it is not the most efficient use of either resin material or fabrication time. For example, in cases where anatomical requirements of the respective patient are comparatively small-to-average, an extensive amount of material must be removed/cut-away from these discs. These material subtractions can easily amount to 90% or more of the total starting resin disc. As a consequence, this can lead to time-intensive processing times for the CNC milling device. Furthermore, the degree of wear for the respective milling tools is relatively high since the milling head is subjected to wear during processing of the blank, and so milling tools must be replaced at regular intervals. Moreover, the milled off material (the millings) must be disposed of or recycled.

More recently, there have been significant advances in the development of additive manufacturing (AM) technologies (also known as three-dimensional (3D) printing), in both equipment and materials developed for these additive manufacturing processes. These technology advancements are now better enabling a transition from the more limited realm of mere 'rapid prototyping' of complex 3D objects, to the broader realm of reliable 'rapid production' for objects requiring critical functional performance in sustained use applications. Thus, efficient 'rapid production' of functionally-reliable, high-quality denture bases by way of additive manufacturing is becoming a more attainable prospect for prosthetic dentistry. In particular, photopolymerizable fluid resin compositions can be prepared and loaded into programmable digitally-controlled light-based curing systems (such as SLA or DLP-based AM systems), where virtual designs of custom, patient-specific denture bases can be formed in a layer-by-layer or progressive photo-curing manner. Historically, both standard SLA printers and DLP-SLA printers are generally regarded as having the best capability for providing the highest print quality characteristics, such as accuracy, resolution, and surface finish for printed objects. These print quality characteristics can be influenced by many commonly known factors in the printing apparatus (e.g., quality and resolution of the light source or optics used), as well as selection of basic printing process conditions or parameters (e.g., slice or layer thickness, and exposure time for photo-curing). However, with respect to denture bases and/or dental prostheses, there remain aspects of design and fabrication involving these additive manufacturing technologies that are deficient.

For the foregoing reasons, there is a need for improved additively manufactured dental devices, and improved methods of using additively manufactured dental devices in the fabrication of dental prostheses.

SUMMARY

The present invention is directed to additively manufactured dental devices, and methods of using additively manufactured dental devices in the fabrication of dental prostheses that better satisfies these and other needs.

In an embodiment, the present disclosure provides for an additively manufactured dental device for use in fabricating a dental prosthesis, where the additively manufactured dental device comprises: (a) a denture base that includes a dental arch form having: a buccal-facing side; a lingual-facing side; and a plurality of tooth sockets, wherein the tooth sockets are disposed along the dental arch form between the buccal-facing side and lingual-facing side; and (b) at least one removable bracing body, wherein the removable bracing body is joined to the denture base at a plurality of locations, such that the removable bracing body includes: at least one fixed juncture with the lingual-facing side of the dental arch form, proximate to an anterior tooth socket within an anterior portion of the dental arch form; at least one fixed juncture with the lingual-facing side of the dental arch form, proximate to a molar tooth socket within a left posterior portion of the dental arch form; and at least one fixed juncture with the lingual-facing side of the dental arch form, proximate to a molar tooth socket within a right posterior portion of the dental arch form; wherein the denture base and removable bracing body both include a photopolymerized polymeric composition. In an optional aspect, the removable bracing body may further comprise at least one fixed juncture with the lingual-facing side of the dental arch form, proximate to a premolar tooth socket within the left posterior portion of the dental arch form, and at least one fixed juncture with the lingual-facing side of the dental arch form, proximate to a premolar tooth socket within the right posterior portion of the dental arch form.

In an aspect of the present disclosure, each fixed juncture with the lingual-facing side of the dental arch form may be located at least about 1 mm, and no more than about 4 mm, below the margin of the tooth socket that the fixed juncture is proximate to along the lingual-facing side.

In another aspect of the present disclosure, each fixed juncture with the lingual-facing side of the dental arch form may include a cross-sectional area of at least about 0.8 mm$^2$ and no more than about 25 mm$^2$.

In another embodiment, the present disclosure provides for an additively manufactured dental device for use in fabricating a dental prosthesis, where the additively manufactured dental device comprises: (a) a denture base that includes a dental arch form having: a buccal-facing side; a lingual-facing side; and a plurality of tooth sockets, wherein the tooth sockets are disposed along the dental arch form between the buccal-facing side and lingual-facing side; and (b) at least one removable bracing body, wherein the removable bracing body is joined to the denture base at a plurality of locations, such that the removable bracing body includes: at least one fixed juncture with the lingual-facing side of the dental arch form, proximate to a molar tooth socket within a left posterior portion of the dental arch form; at least one fixed juncture with the lingual-facing side of the dental arch form, proximate to a molar tooth socket within a right posterior portion of the dental arch form; at least one fixed juncture with the lingual-facing side of the dental arch form, proximate to a premolar tooth socket within the left posterior portion of the dental arch form; and at least one fixed juncture with the lingual-facing side of the dental arch form, proximate to a premolar tooth socket within the right posterior portion of the dental arch form; wherein the denture base and removable bracing body both include a photopolymerized polymeric composition.

In another embodiment, the present disclosure provides for an additively manufactured dental device for use in fabricating a dental prosthesis, where the additively manufactured dental device comprises: (a) a denture base that includes a dental arch form having: a buccal-facing side; a lingual-facing side; and a plurality of tooth sockets, wherein the tooth sockets are disposed along the dental arch form between the buccal-facing side and lingual-facing side; (b) a first removable bracing body, wherein the first removable bracing body is joined to the denture base at two or more locations, such that the first removable bracing body includes: at least one fixed juncture with the lingual-facing side of the dental arch form, proximate to a molar tooth socket within a left posterior portion of the dental arch form; and at least one fixed juncture with the lingual-facing side of the dental arch form, proximate to a molar tooth socket within a right posterior portion of the dental arch form; and (c) a second removable bracing body, wherein the second removable bracing body is joined to the denture base at two or more locations, such that the second removable bracing body includes: at least one fixed juncture with the lingual-facing side of the dental arch form, proximate to a premolar tooth socket within the left posterior portion of the dental arch form; and at least one fixed juncture with the lingual-facing side of the dental arch form, proximate to a premolar tooth socket within the right posterior portion of the dental arch form; wherein the first removable bracing body is not joined to the second removable bracing body, and wherein the denture base and each removable bracing body include a photopolymerized polymeric composition.

In another embodiment, the present disclosure provides for an additively manufactured dental device for use in fabricating a dental prosthesis, where the additively manufactured dental device comprises: (a) a maxillary denture base that includes a dental arch form having: a buccal-facing side; a lingual-facing side; a plurality of tooth sockets, wherein the tooth sockets are disposed along the dental arch form between the buccal-facing side and lingual-facing side; and a palatal vault portion, wherein the palatal vault portion is integrally formed with and extended across the lingual-facing side of the dental arch form; and (b) at least one removable bracing body, wherein the removable bracing body is joined to the maxillary denture base at a plurality of locations, such that the removable bracing body includes: at least one fixed juncture with the lingual-facing side of the palatal vault portion; at least one fixed juncture with the lingual-facing side of the dental arch form, proximate to a molar tooth socket within a left posterior portion of the dental arch form; and at least one fixed juncture with the lingual-facing side of the dental arch form, proximate to a molar tooth socket within a right posterior portion of the dental arch form; wherein the denture base and removable bracing body both include a photopolymerized polymeric composition. In an optional aspect, the removable bracing body may further comprise at least one fixed juncture with the lingual-facing side of the dental arch form, proximate to a premolar tooth socket within the left posterior portion of the dental arch form, and at least one fixed juncture with the lingual-facing side of the dental arch form, proximate to a premolar tooth socket within the right posterior portion of the dental arch form. In another optional aspect, the removable bracing body may further comprise at least one fixed juncture with the lingual-facing side of the dental arch form, proximate to an anterior tooth socket within an anterior portion of the dental arch form.

In another embodiment, the present disclosure provides for a method of fabricating a dental prosthesis from an additively manufactured dental device, where the method comprises the steps of: (a) obtaining an additively manufactured dental device from a light-based three-dimensional printing apparatus, the additively manufactured dental device comprising: (i) a denture base that includes a dental arch form having: a buccal-facing side; a lingual-facing side; and a plurality of tooth sockets, wherein the tooth sockets are disposed along the dental arch form between the buccal-facing side and lingual-facing side; and (ii) at least one removable bracing body, wherein the removable bracing body is joined to the denture base at a plurality of locations, such that the removable bracing body includes: at least one fixed juncture with the lingual-facing side of the dental arch form, proximate to an anterior tooth socket within an anterior portion of the dental arch form; at least one fixed juncture with the lingual-facing side of the dental arch form, proximate to a molar tooth socket within a left posterior portion of the dental arch form; and at least one fixed juncture with the lingual-facing side of the dental arch form, proximate to a molar tooth socket within a right posterior portion of the dental arch form; wherein the denture base and removable bracing body both include a photopolymerized polymeric composition; (b) performing at least one wash treatment on the additively manufactured dental device to remove unreacted or residual photopolymerizable polymeric composition from surfaces of the additively manufactured dental device; (c) bonding artificial teeth within the tooth sockets of the additively manufactured dental device; (d) performing a secondary photo-curing treatment on the additively manufactured dental device to substantially complete curing of the photopolymerized polymeric composition; and (e) separating each removable bracing body from the additively manufactured dental device.

In another embodiment, the present disclosure provides for a method of fabricating a dental prosthesis from an additively manufactured dental device, where the method comprises the steps of: (a) obtaining an additively manufactured dental device from a light-based three-dimensional printing apparatus, the additively manufactured dental device comprising: (i) a denture base that includes a dental arch form having: a buccal-facing side; a lingual-facing side; and a plurality of tooth sockets, wherein the tooth sockets are disposed along the dental arch form between the buccal-facing side and lingual-facing side; and (ii) at least one removable bracing body, wherein the removable bracing body is joined to the denture base at a plurality of locations, such that the removable bracing body includes: at least one fixed juncture with the lingual-facing side of the dental arch form, proximate to a molar socket within a left posterior portion of the dental arch form; at least one fixed juncture with the lingual-facing side of the dental arch form, proximate to a molar tooth socket within a right posterior portion of the dental arch form; at least one fixed juncture with the lingual-facing side of the dental arch form, proximate to a premolar tooth socket within a left posterior portion of the dental arch form; and at least one fixed juncture with the lingual-facing side of the dental arch form, proximate to a premolar tooth socket within a right posterior portion of the dental arch form; wherein the denture base and removable bracing body both include a photopolymerized polymeric composition; (b) performing at least one wash treatment on the additively manufactured dental device to remove unreacted or residual photopolymerizable polymeric composition from surfaces of the additively manufactured dental device; (c) bonding artificial teeth within the tooth sockets of the additively manufactured dental device; (d) performing a secondary photo-curing treatment on the additively manufactured dental device to substantially complete curing of the photopolymerized polymeric composition; and (e) separating each removable bracing body from the additively manufactured dental device.

In another embodiment, the present disclosure provides for a method of fabricating a dental prosthesis from an additively manufactured dental device, where the method comprises the steps of: (a) obtaining an additively manufactured dental device from a light-based three-dimensional printing apparatus, the additively manufactured dental device comprising: (i) a maxillary denture base that includes a dental arch form having: a buccal-facing side; a lingual-facing side; a plurality of tooth sockets, wherein the tooth sockets are disposed along the dental arch form between the buccal-facing side and lingual-facing side; and a palatal vault portion, wherein the palatal vault portion is integrally formed with and extended across the lingual-facing side of the dental arch form; and (ii) at least one removable bracing body, wherein the removable bracing body is joined to the denture base at a plurality of locations, such that the removable bracing body includes: at least one fixed juncture with the lingual-facing side of the palatal vault portion; at least one fixed juncture with the lingual-facing side of the dental arch form, proximate to a molar tooth socket within a left posterior portion of the dental arch form; and at least one fixed juncture with the lingual-facing side of the dental arch form, proximate to a molar tooth socket within a right posterior portion of the dental arch form; wherein the denture base and removable bracing body both include a photopolymerized polymeric composition; (b) performing at least one wash treatment on the additively manufactured dental device to remove unreacted or residual photopolymerizable polymeric composition from surfaces of the additively manufactured dental device; (c) bonding artificial teeth within the tooth sockets of the additively manufactured dental device; (d) performing a secondary photo-curing treatment on the additively manufactured dental device to substantially complete curing of the photopolymerized polymeric composition; and (e) separating each removable bracing body from the additively manufactured dental device.

BRIEF DESCRIPTION OF THE DRAWINGS

These and other features, aspects, exemplary embodiments, and advantages of the present invention will become better understood with regard to the following description, appended claims, and accompanying drawings where:

DETAILED DESCRIPTION

In the Summary above, and in the Detailed Description and Claims presented below, along with the accompanying drawings, reference is made to particular features and embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The following additional definitions shall apply throughout the specification and claims of the invention, unless specifically indicated otherwise.

The term "about" is used herein as a term of approximation to mean plus or minus 5 percent of the specified value, preferably plus or minus 3 percent of the specified value, more preferably plus or minus 1 percent of the specified value.

The terms "essentially" and "substantially" are used herein as terms of approximation to denote in large part, but not necessarily wholly or perfectly, in relation to the fundamental nature or predominant characteristic being described.

The term "at least" followed by a number is used herein to denote the start of a range beginning with that number (which may be a range having an upper limit or no upper limit, depending on the variable being defined). For example, "at least 1" means 1 or more than 1.

The terms "at most" or "no more than" followed by a number is used herein to denote the end of a range ending with that number (which may be a range having 1 or 0 as its lower limit, or a range having no lower limit, depending upon the variable being defined). For example, "at most 100" or "no more than 100" means 100 or less than 100. When, in this specification, a range is given as "(a first number) to (a second number)" or "(a first number)–(a second number)," this means a range whose lower limit is the first number and whose upper limit is the second number. For example, 1 to 5 mm means a range whose lower limit is 1 mm, and whose upper limit is 5 mm.

The term "and/or," as used herein, includes any and all possible combinations of one or more of the associated listed items, as well as the lack of combination when interpreted in the alternative ("or"). For example, "A and/or B" means A alone, B alone, or A and B together or mixtures thereof.

Directional or spatially relative terms, such as "under," "below," "beneath," "lower," "over," "upper," "above," "on top," "left," "right," and the like, may be used herein for ease of description to describe the relationship of an element or feature to other element(s) or feature(s) illustrated in the figures. It will be understood that the spatially relative terms are intended to encompass different orientations of the device in addition to the orientations depicted in the figures. For example, if the device in the figures were to be inverted, elements or features described as "above" or "on top" other elements or features would then be oriented "below" or "under" the other elements or features. The device may be otherwise oriented (e.g., rotated at 90 degrees or other orientations) and the spatially relative descriptors used herein interpreted accordingly. Similarly, the terms "upward," "downward," "vertical," "horizontal" and the like are used herein for the purpose of relative explanation only, unless specifically indicated otherwise.

The term "dental arch form" is used herein to mean the three-dimensional curved configuration or shape of a dental arch, either a maxillary (upper) arch or mandibular (lower) arch, that resembles the contour where the alveolar crest and dentition reside. It should also be understood that a "dental arch form" is not meant to be limited to full denture bases and prostheses only, but also applies to partial denture bases and prostheses.

The term "lingual-facing side" is used herein to mean in the direction or space facing next to or toward the tongue of the oral cavity.

The term "buccal-facing side" is used herein to mean the direction or space facing next to or toward the cheek and/or lips of the oral cavity.

The term "bracing body" is used herein to mean a rigid or semi-rigid member providing mechanical/physical strengthening and/or reinforcement for an adjoining or surrounding structure.

The term "anterior portion" is used herein to mean the forward region or front portion of a denture base where anterior teeth (i.e., incisor and/or canine/cuspid teeth) and/or anterior teeth sockets may be arranged.

The term "posterior portion" is used herein to mean the dorsal region or back portion of a denture base where posterior teeth (i.e., molar and/or premolar/bicuspid teeth) and/or posterior teeth sockets may be arranged.

The term "palatal vault portion" is used herein to mean the curved surface portion conforming to the most superior part or inner roof of the oral cavity, generally regarded as the arched form of the hard palate, located within the maxillary (upper) arch.

The term "median line" or "midline" is used herein to mean the imaginary centerline dividing a body, and particularly the jaw, into the left and right halves.

The term "mesial-distal orientation" is used herein to mean the direction of curvature of the dental arch from the median line or midline of the dental arch to the distal or remote end of the dental arch.

Disclosures presented herein provide explanations and illustrative examples of additively manufactured dental devices for use in fabricating dental prostheses, and methods of using these additively manufactured dental devices to fabricate dental prostheses.

Additively Manufactured Dental Devices

Additively manufactured dental devices of the present disclosure may comprise a denture base and at least one removable bracing body joined to the denture base at a plurality of locations.

Figure 1A:
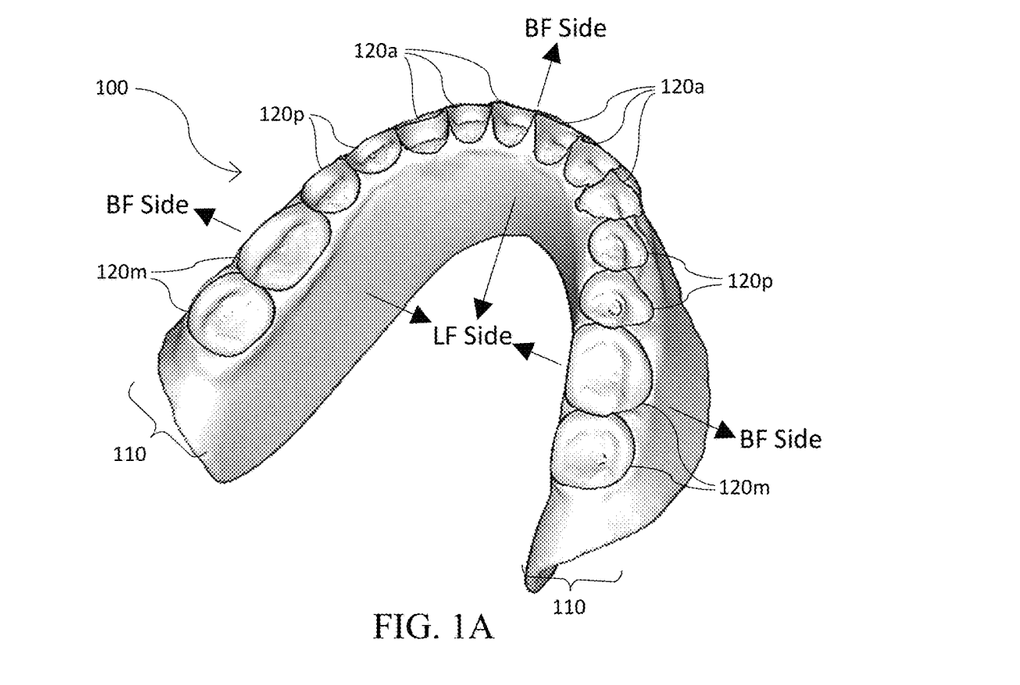
FIG. 1A shows a perspective view of a three-dimensional (3D) digital image for a mandibular (lower) complete, or full, denture base with tooth sockets disposed along the dental arch form.
Figure 1B:
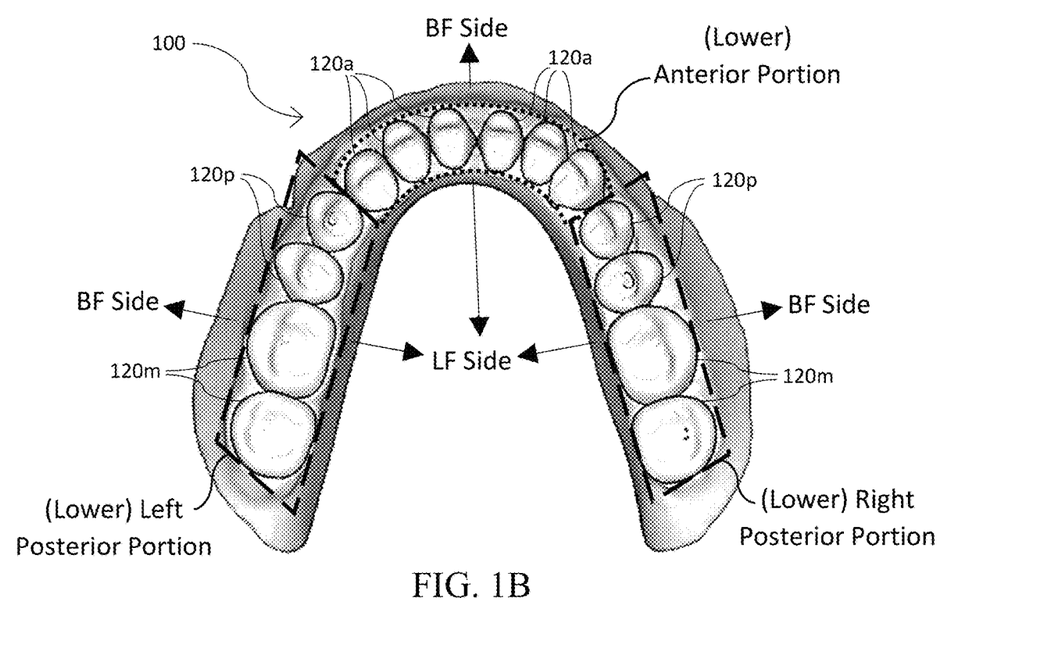
FIG. 1B shows a top view (viewing vertically down on the tooth sockets) onto a three-dimensional (3D) digital image for a mandibular (lower) complete, or full, denture base with tooth sockets disposed along the dental arch form.
Figure 2A:
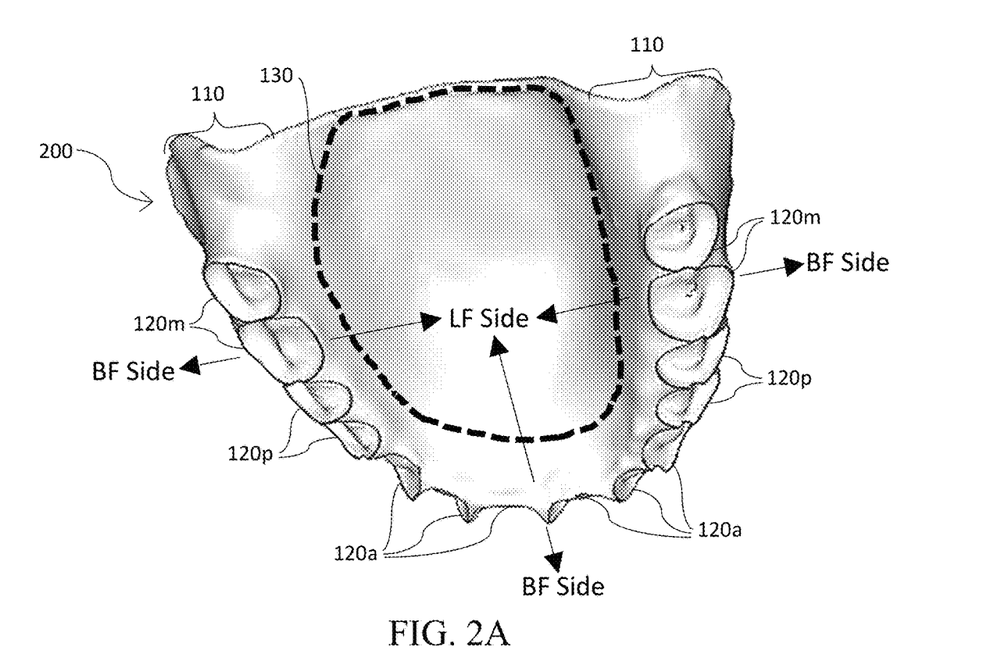
FIG. 2A shows a perspective view of a three-dimensional (3D) digital image for a maxillary (upper) complete, or full, denture base with tooth sockets disposed along the dental arch form.
Figure 2B:
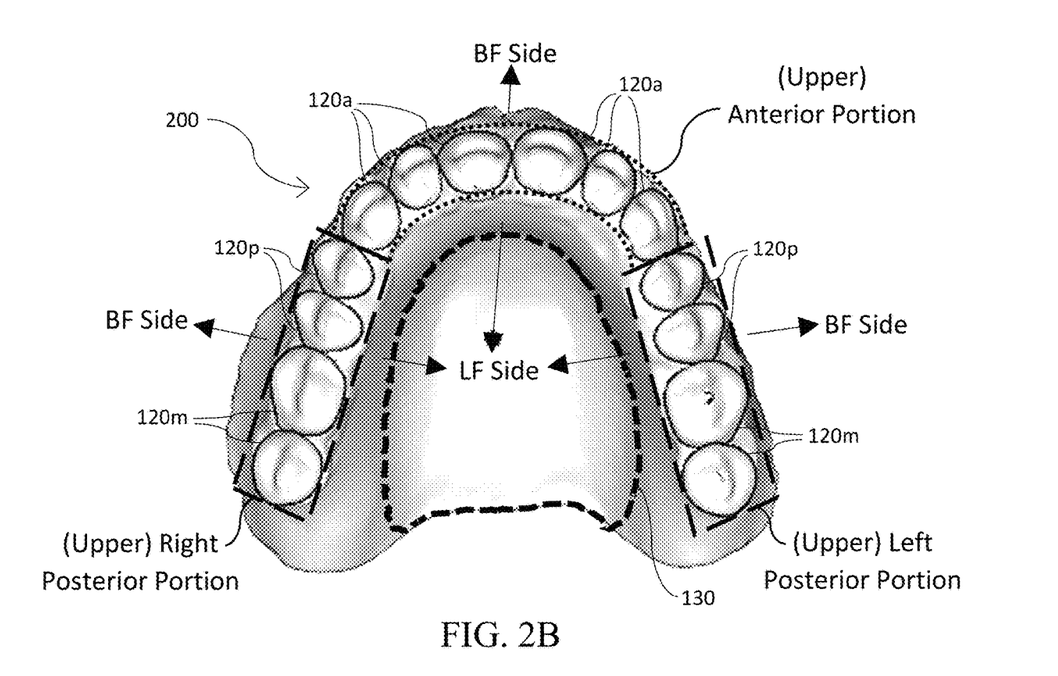
FIG. 2B shows a top view (viewing vertically down on the tooth sockets) onto a three-dimensional (3D) digital image for a maxillary (upper) complete, or full, denture base with tooth sockets disposed along the dental arch form.
Figure 3A:
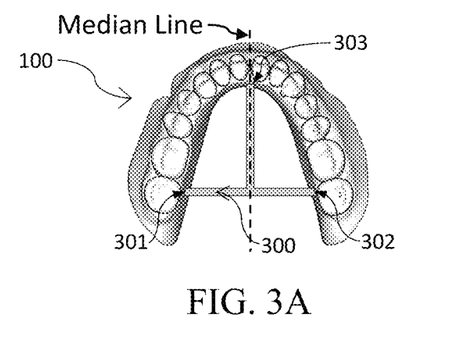
FIG. 3A-3H show top views of a three-dimensional (3D) digital image for various exemplary embodiments of one or more removable bracing bodies joined to a mandibular (lower) full denture base.
Figure 3B:
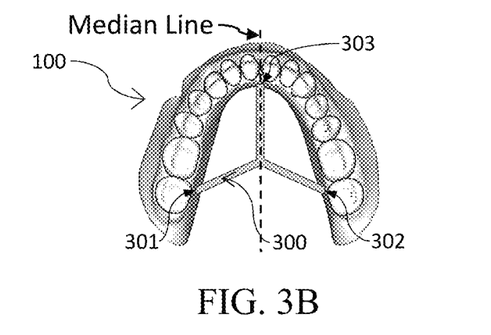
Figure 3C:
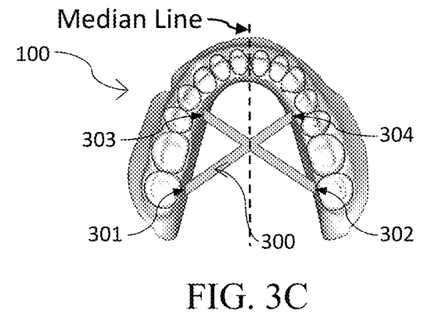
Figure 3D:
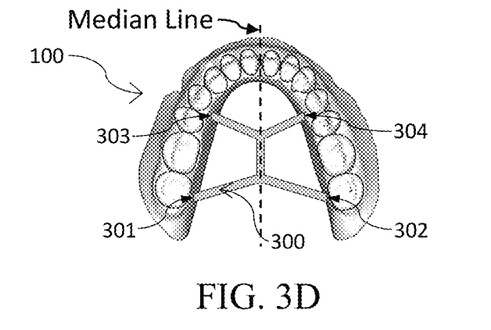
Figure 3E:
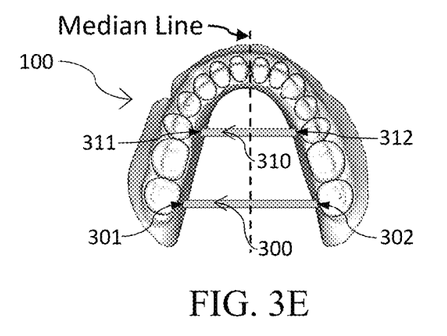
Figure 3F:
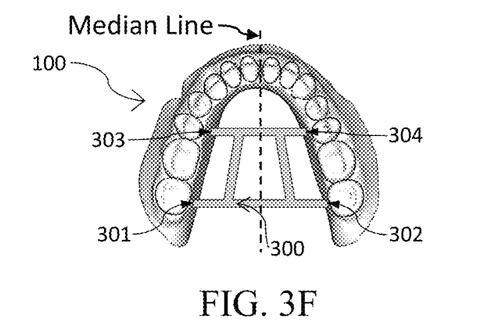
Figure 3G:
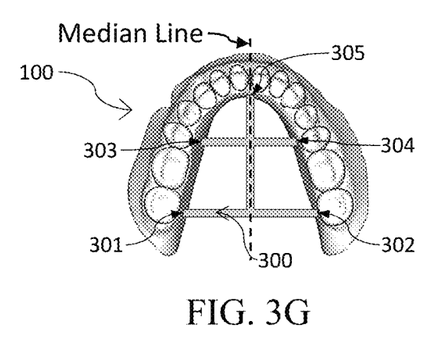
Figure 3H:
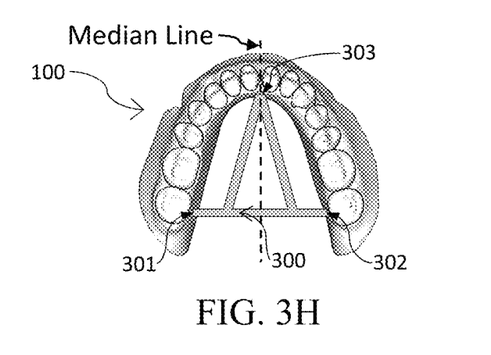
Figure 4A:
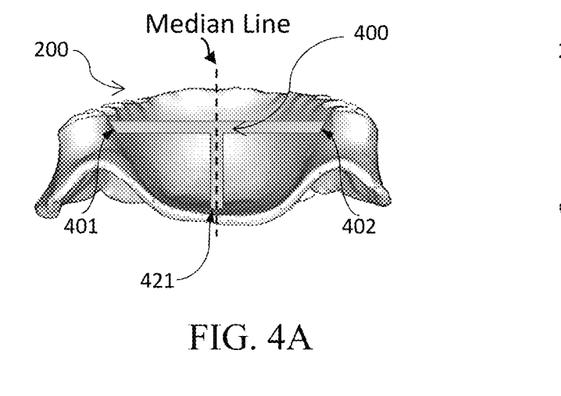
FIG. 4A-4F show back-end views (viewing from the posterior end) of a three-dimensional (3D) digital image for various exemplary embodiments of a removable bracing body joined to a maxillary (upper) full denture base.
Figure 4B:
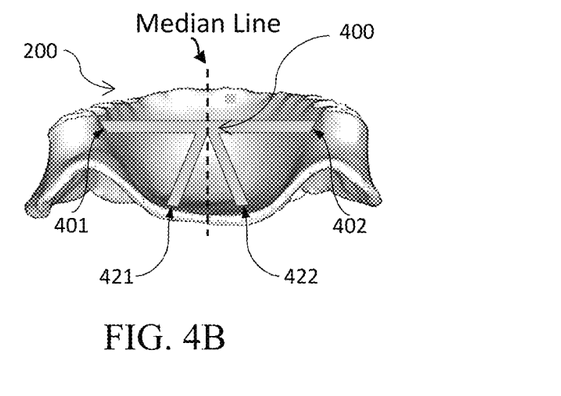
Figure 4C:
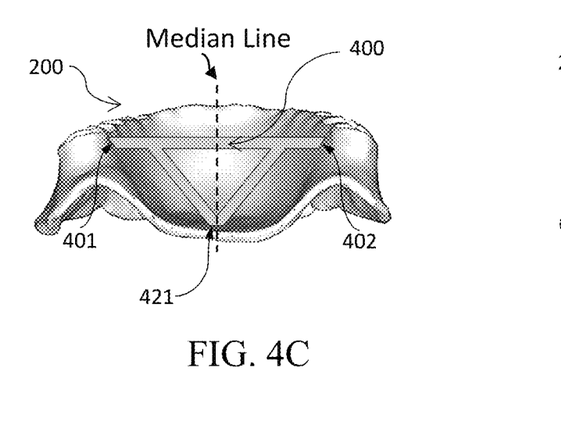
Figure 4D:
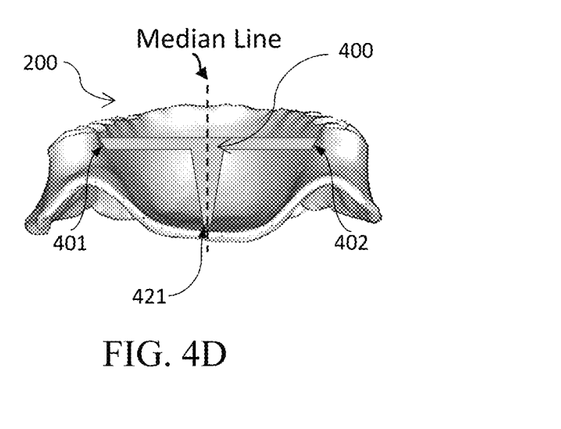
Figure 4E:
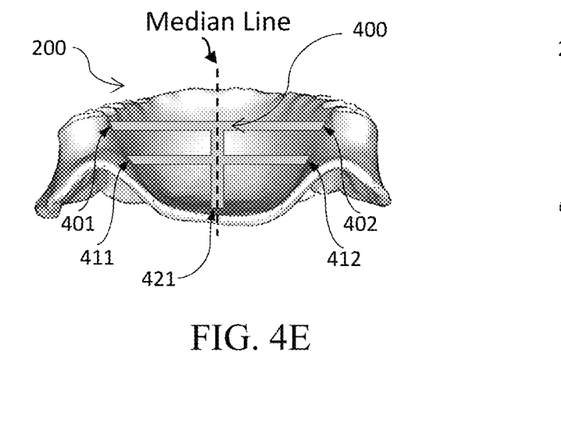
Figure 4F:
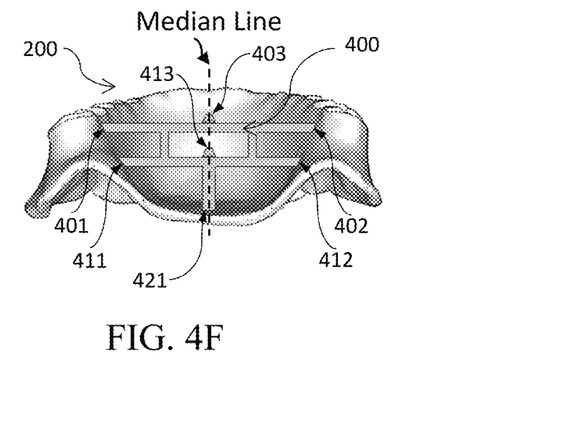

As shown in FIGS. 1A and 1B, a mandibular denture base (100) may be comprised of a dental arch form (110) having a buccal-facing side ("BF Side" as shown in FIGS. 1A and 1B) and a lingual-facing side ("LF Side" as shown in FIGS. 1A and 1B). A plurality of tooth sockets (120a, 120p, 120m) may be disposed along the dental arch form, in a recessed manner, between the buccal-facing side and the lingual-facing side. Similarly, as shown in FIGS. 2A and 2B, a maxillary denture base (200) may be comprised of a dental arch form (110) having a buccal-facing side ("BF Side" as shown in FIGS. 2A and 2B), a lingual-facing side ("LF Side" as shown in FIGS. 2A and 2B), and a palatal vault portion (130), where the palatal vault portion is integrally formed with and extended across the lingual-facing side of the dental arch form. Likewise, a plurality of tooth sockets (120a, 120p, 120m) may be disposed along the dental arch form, in a recessed manner, between the buccal-facing side and the lingual-facing side.

For both a mandibular denture base and a maxillary denture base, the dental arch form may have one or more tooth sockets located within an "anterior portion," a "left posterior portion," and a "right posterior portion." The "anterior portion" may have tooth sockets (120a) for incisor and cuspid/canine tooth forms. The "left posterior portion" and "right posterior portion" each may have tooth sockets for premolar/bicuspid (120p) and molar (120m) tooth forms. Tooth sockets may be arranged in adjacent or neighboring positions along the dental arch form in a mesial-distal orientation. To ensure a more natural-looking dental prosthesis, it is also advantageous that each of the tooth sockets be configured for receiving a suitable artificial tooth form. Without intending to be limiting, a suitable artificial tooth form is one where the outer contour, or shape profile, and size corresponds to an appropriate artificial tooth type (i.e., incisor, cuspid/canine, bicuspid/premolar, molar) and/or tooth number (such as used in the FDI World Dental Federation notation system) in relation to the native oral anatomy and location or position along a dental arch. And while FIG. 1A/1B and FIG. 2A/2B provide representative examples for a mandibular full denture base and maxillary full denture base, respectively, it should also be understood that the present disclosure is not intended to be limited to only full denture bases. Embodiments of the invention may be applied to full denture bases and partial denture bases.

At least one removable bracing body may be joined to the denture base at more than one location with the lingual-facing side of the denture base. FIG. 3A-3H show various exemplary embodiments of one or more removable bracing bodies (300, 310) joined to a mandibular denture base (100) at a plurality of locations (such as 301, 302, 303, 304, 305, 311, 312) with the lingual-facing side of the dental arch form. It should also be understood that although the various exemplary embodiments of removable bracing bodies in FIG. 3A-3H are shown with respect to a mandibular denture base, these same or similar bracing bodies may be applied to a maxillary denture base. In still other embodiments, for the specific case of producing a maxillary denture base (having the additional feature of a palatal vault portion integrally formed with and extended across the lingual-facing side of the dental arch form), FIG. 4A-4F show various exemplary embodiments of a removable bracing body (400) joined to a maxillary denture base (200) at a plurality of locations (such as 401, 402, 403, 411, 412, 413, 421) with the lingual-facing side of the dental arch form. A removable bracing body, as used herein, is a rigid or semi-rigid member that may be located at specific positions on the lingual-facing side of the dental arch form to provide mechanical/physical strengthening and/or reinforcement to the adjoining denture base after printing, prior to its removal.

A removable bracing body of the present disclosure may be differentiated and distinct from conventional 'removable support structures' utilized in 3D printing processes. In comparative consideration, conventional 'removable support structures' are applied to connect to the final intended object with minimal contact area size and strength (i.e., as small and as weak as possible to perform a 'support' function only during printing), and only sparingly connected where necessary for initial printing of the object. Thus, they have only been included and placed for the temporary sake of enabling an object to be printed, but then readily removed after printing. It has generally been more desirable practice to minimize use of 'removable support structures' by printing objects in an orientation that lessens the need for supports, so long as the object can still be accurately reproduced.

Furthermore, outside the process boundaries of initial denture base printing/formation, conventional 'removable support structures' have not been specifically designed in a manner capable of providing mechanical/physical strengthening and/or reinforcement for a denture base to withstand additional insults (e.g., heat and/or pressure) after printing that could distort or otherwise be detrimental to dimensional integrity. In fact, it has generally been the recommended practice or goal in 3D printing to minimize application (frequency/number and/or size) of additional structures joined to the object. This is done for several reasons. One factor is the extra time/labor associated with designing and/or printing additional structure(s) and their removal after printing. Another factor may be to minimize detrimental effects to surface finish/appearance of the final object. And a third factor may be the 'wasted' printed material, which typically must be discarded as no longer useable or recyclable after removal from the object.

Therefore, in relation to denture bases, there exist printing scenarios where, depending on the selection of resin composition, printing orientation, and/or other printing process conditions, denture bases may still be printed without resorting to any 'removable support structure' joined to any portion of the lingual-facing side of the dental arch form. Conventional 'removable support structures' have neither been specifically constructed, nor specifically configured, to the lingual-facing side of a denture base in a manner purposed for, or capable of, functioning as a bracing body of the present disclosure. Prior to the present disclosure, there has been no consideration of temporary specialized structures being established to confer additional benefits to a denture base after it has been printed. In contrast, bracing bodies of the present disclosure have been specifically designed and established in an unexpected manner, providing surprising additional benefits. Bracing bodies of the present disclosure enhance denture base dimensional stability/integrity, particularly during post-print processing steps of artificial tooth bonding and secondary curing, prior to bracing body removal from the final dental prosthesis.

In an embodiment, a removable bracing body may be joined to a denture base at a plurality of locations, such that the removable bracing body comprises: at least one fixed juncture with the lingual-facing side of the dental arch form, proximate to an anterior tooth socket (120a) within an anterior portion of the dental arch form; at least one fixed juncture with the lingual-facing side of the dental arch form, proximate to a molar tooth socket (120m) within a left posterior portion of the dental arch form; and at least one fixed juncture with the lingual-facing side of the dental arch form, proximate to a molar tooth socket (120m) within a right posterior portion of the dental arch form. In an optional or alternative manner, the removable bracing body may further comprise: at least one fixed juncture with the lingual-facing side of the dental arch form, proximate to a premolar tooth socket (120p) within the left posterior portion of the dental arch form; and at least one fixed juncture with the lingual-facing side of the dental arch form, proximate to a premolar tooth socket (120p) within the right posterior portion of the dental arch form.

In another embodiment, a removable bracing body may be joined to a denture base at a plurality of locations, such that the removable bracing body may comprise: at least one fixed juncture with the lingual-facing side of the dental arch form, proximate to a molar tooth socket (120m) within a left posterior portion of the dental arch form; at least one fixed juncture with the lingual-facing side of the dental arch form, proximate to a molar tooth socket (120m) within a right posterior portion of the dental arch form; at least one fixed juncture with the lingual-facing side of the dental arch form, proximate to a premolar tooth socket (120p) within the left posterior portion of the dental arch form; and at least one fixed juncture with the lingual-facing side of the dental arch form, proximate to a premolar tooth socket (120p) within the right posterior portion of the dental arch form.

In another embodiment, a first removable bracing body may be joined to a denture base, and a second removable bracing body may be joined to a denture base, such that the first removable bracing body may not be joined or connected to the second removable bracing body. A first removable bracing body may be joined to the denture base at two or more locations, such that the first removable bracing body may comprise: at least one fixed juncture with the lingual-facing side of the dental arch form, proximate to a molar tooth socket (120m) within a left posterior portion of the dental arch form; and at least one fixed juncture with the lingual-facing side of the dental arch form, proximate to a molar tooth socket (120m) within a right posterior portion of the dental arch form. A second removable bracing body may be joined to the denture base at two or more locations, such that the second removable bracing body comprises: at least one fixed juncture with the lingual-facing side of the dental arch form, proximate to a premolar tooth socket (120p) within the left posterior portion of the dental arch form; and at least one fixed juncture with the lingual-facing side of the dental arch form, proximate to a premolar tooth socket (120p) within the right posterior portion of the dental arch form.

In still another embodiment, in particular for a maxillary denture base, a removable bracing body may be joined to a maxillary denture base at a plurality of locations, such that the removable bracing body may comprise: at least one fixed juncture with the lingual-facing side of the palatal vault portion (130); at least one fixed juncture with the lingual-facing side of the dental arch form, proximate to a molar tooth socket (120m) within a left posterior portion of the dental arch form; and at least one fixed juncture with the lingual-facing side of the dental arch form, proximate to a molar tooth socket (120m) within a right posterior portion of the dental arch form. In a preferred, but optional, manner, at least one fixed juncture with the lingual-facing side of the palatal vault portion (130) may be positioned substantially at the median line of the dental arch form. In another preferred, but optional, manner, two or more fixed junctures on the lingual-facing side of the palatal vault portion (130) may be positioned substantially equidistant to the median line of the dental arch form. In an optional or alternative manner, the removable bracing body may further comprise: at least one fixed juncture with the lingual-facing side of the dental arch form, proximate to a premolar tooth socket (120p) within the left posterior portion of the dental arch form; and at least one fixed juncture with the lingual-facing side of the dental arch form, proximate to a premolar tooth socket (120p) within the right posterior portion of the dental arch form. In yet another optional or alternative manner, the removable bracing body may further comprise at least one fixed juncture with the lingual-facing side of the dental arch form, proximate to an anterior tooth socket (120a) within an anterior portion of the dental arch form.

In an embodiment, each fixed juncture with the lingual-facing side of the dental arch form may be further located at vertical height/depth (i.e., when viewing from the back-end or posterior end view of a denture base, such as shown in FIG. 4A-4F) below the margin of the tooth socket that the fixed juncture is proximate to along the lingual-facing side. In a preferred embodiment, each fixed juncture with the lingual-facing side of the dental arch form may be located at least about 1 mm below (lower than) the margin of the tooth socket that the fixed juncture is proximate to along the lingual-facing side. It has been observed that having each of these fixed junctures at least about 1 mm below the margin of a tooth socket may be more advantageous for preventing, or at least reducing, dimensional deformation of the tooth socket by the bracing body, during either printing or other post-printing procedures.

Figure 5A:
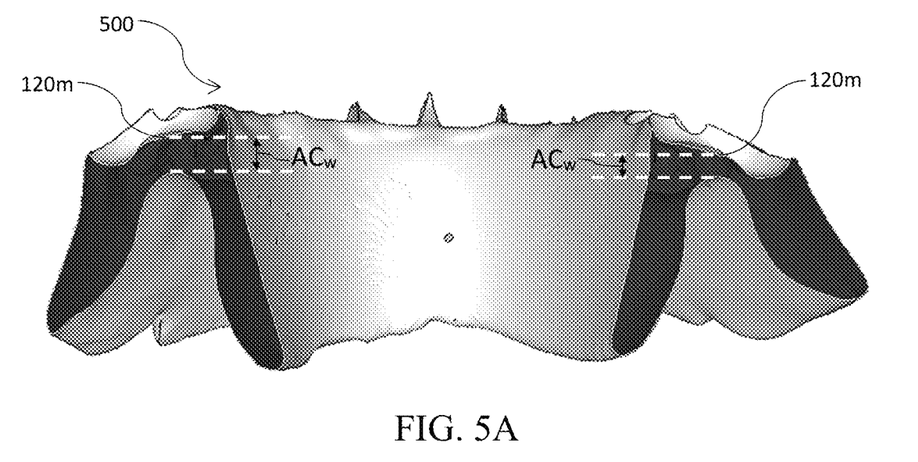
FIG. 5A shows a back-end view (viewing from the posterior end) of a three-dimensional (3D) digital image for an exemplary cross-section of a mandibular denture base having a comparatively 'very thin' cross-sectional width in the dental arch form.
Figure 5B:
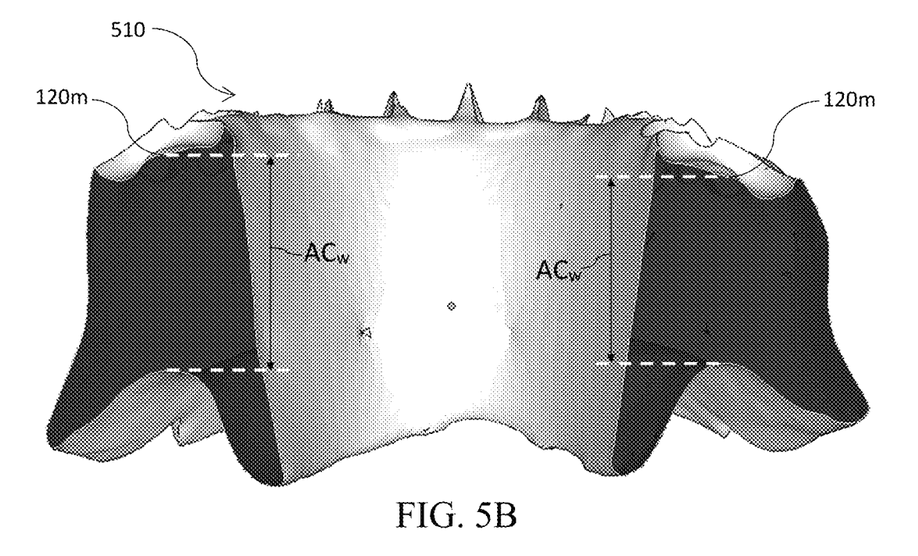
FIG. 5B shows a back-end view (viewing from the posterior end) of a three-dimensional (3D) digital image for an exemplary cross-section of a mandibular denture base having a comparatively 'very thick' cross-sectional width in the dental arch form.

For some edentulous patients, their oral anatomy may govern the use of dental arch forms having one or more comparatively 'very thin' cross-sectional widths/thicknesses (i.e., about 1 mm to about 3 mm), particularly underneath tooth sockets in the area of the alveolar crest, or top of the residual ridge, of the dental arch form. This dimensional width, herein designated as "$AC_w$", is shown in FIG. 5A for a mandibular denture base (500) having a comparatively 'very thin' cross-sectional width. Conversely for some other edentulous patients, their oral anatomy may govern the use of dental arch forms having one or more comparatively 'very thick' cross-sectional widths/thicknesses (i.e., greater than about 9 mm), particularly underneath tooth sockets in the area of the alveolar crest, or top of the residual ridge, of the dental arch form. This dimensional width is also shown in FIG. 5B for a mandibular denture base (510) having a comparatively 'very thick' cross-sectional width. So, for reasons similar to those previously stated with respect to the tooth socket, it may be preferable for each fixed juncture with the lingual-facing side of the dental arch form to be located no more than about 4 mm below (lower than) the margin of the tooth socket that the fixed juncture is proximate to along the lingual-facing side. In specific examples, it has been observed that having each of these fixed junctures no more than about 4 mm below the margin of a tooth socket may be more advantageous for preventing, or at least reducing, dimensional deformation along the lingual-facing side of the dental arch form in the course of either printing or other post-printing procedures.

In a preferred embodiment, each fixed juncture with the lingual-facing side of the dental arch form, and/or the palatal vault portion, of a denture base may have a cross-sectional area of at least about 0.8 mm² and no more than about 25 mm². In a more preferred embodiment, each fixed juncture with the lingual-facing side of the dental arch form, and/or the palatal vault portion, of a denture base may have a cross-sectional area of at least about 1.5 mm² and no more than about 20 mm². In a still more preferred embodiment, each fixed juncture with the lingual-facing side of the dental arch form, and/or the palatal vault portion, of a denture base may have a cross-sectional area of at least about 2 mm² and no more than about 15 mm².

The cross-sectional area of each fixed juncture may be designed to be substantially the same as the cross-sectional area of each of the other fixed junctures connected to a denture base. Without wishing to be bound by any theory, for some bracing body configurations this may be advantageous in providing more balanced/unbiased or evenly distributed mechanical strengthening or reinforcement across the denture base. In an alternative, the cross-sectional area of each fixed juncture may be designed to be substantially different from the cross-sectional area of each of the other fixed junctures connected to a denture base. In still another alternative, the cross-sectional areas of two or more fixed junctures connected to a denture base may be designed to be substantially the same to each other, whereby these cross-sectional areas may be substantially different from the cross-sectional area of one or more other fixed junctures connected to a denture base. Without wishing to be bound by any theory, for some bracing body configurations these alternatives may be advantageous in establishing larger connections for more robust bracing strength/reinforcement at specific locations of a denture base (e.g., for portions that may be weaker of more susceptible to being distorted by mechanical stress), while also allowing for smaller connections for less robust bracing strength/reinforcement at other specific locations of a denture base.

In some embodiments, it may be preferable or further advantageous (though not required) for a bracing body to be substantially symmetrical in shape and/or size about the median line of the dental arch form. Thus, it may be advantageous to have an equal or matching number of fixed junctures left of the median line of the dental arch form, as the number of fixed junctures right of the median line of the dental arch form. Similar to an observation discussed above, for some bracing body configurations this may be advantageous in providing more balanced/unbiased or evenly distributed mechanical strengthening or reinforcement across the denture base.

The cross-sectional profile of each fixed juncture may be of any shape without limitation. However, when also taking into consideration additional factors, such as convenience of design effort and/or ease of printing or removal, it may be more efficient and advantageous to favor the use of simple, symmetrical geometric forms (e.g., round, oval/ellipsoid, square) for the bracing bodies, instead of more complex and/or unsymmetrical geometric forms.

A denture base and removable bracing body of the present disclosure may be comprised of a photopolymerized polymeric composition. In a non-limiting manner, any liquid photopolymerizable polymeric composition that can be effectively photo-cured from a light-based 3D printing apparatus may be suitable to use in the additive manufacturing of dental devices of the present disclosure. Effective photocuring of the liquid photopolymerizable composition results in rapid cross-linking and hardening of the polymeric composition in-situ to form a solid structure according to a 3D digital model used by a light-based 3D printing apparatus. Effective photocuring of the liquid photopolymerizable composition may be accomplished with either partial curing (i.e., limited or incomplete cross-linking and hardening) or full curing (i.e., complete, or essentially complete, cross-linking and hardening) of the polymeric composition by the 3D printing apparatus. The chemical and physical properties of the photopolymerized polymeric composition may be selected and/or adapted as needed by those skilled in the art to suit specific desired end-use properties (e.g., biocompatibility, mechanical durability (strength/flexibility), color, etc.) of the printed denture base. The liquid photopolymerizable polymeric composition also may be selected and/or adapted as needed by those skilled in the art to suit particular constraints or limitations of the chosen 3D printing apparatus. In a preferred embodiment, the photopolymerized polymeric composition may have a glass-transition temperature ($T_g$) greater than about 35° C., and less than about 100° C. In another preferred embodiment, the photopolymerized polymeric composition may comprise an acrylate-based rubber impact modified resin composition, wherein the final cured resin properties of the photopolymerized polymeric composition have a fracture toughness ($K_{max}$) of between about 1 MPa m$^{1/2}$ to about 4 MPa m$^{1/2}$, a work of fracture of between about 300 J/m² to about 4000 J/m², and a flexural strength of between about 5 MPa to about 200 MPa at 23° C., when prepared and measured according to ISO20795-1: 2013.

Fabrication of Dental Devices and Dental Prostheses

Additively manufactured dental devices of the present disclosure may be obtained from a light-based 3D printing apparatus. The 3D printing apparatus may utilize any light-based photo-curing techniques, such as laser-based stereolithography (laser SLA), digital light processing stereolithography (DLP-SLA), or masked stereolithography (MSLA). More recent advances in continuous printing processes, such as so-called Continuous Digital Light Manufacturing (cDLM) and Continuous Liquid Interface Production (CLIP) processes, may be particularly advantageous. Obtaining an additively manufactured dental device of the present disclosure may be accomplished most directly by printing locally for more contemporaneous or immediate subsequent use. In an alternative, obtaining an additively manufactured dental device of the present disclosure also may be accomplished more indirectly by having the dental device printed in a remote or decoupled manner (e.g., as part of a distributed manufacturing environment or network), and then distributed to others for their secondary subsequent later use.

Subject to a number of application-specific considerations, including the operating requirements or constraints of the specific 3D printing apparatus chosen, the chemical and/or physical properties of the specific liquid photopolymerizable composition chosen for printing, as well as the thickness of a denture base and removable bracing body, effective printing process parameters may be selected within software of the computing system in operative control of the light-based 3D printing apparatus. In a non-limiting manner, suitable printing process parameters may be determined and selected by those skilled in the art so that the liquid photopolymerizable composition may be effectively photocured in accordance with the 3D digital model of the dental device (as well as any removable support structures for the dental device) provided to the 3D printing apparatus.

After obtaining an additively manufactured dental device, methods of fabricating a dental prosthesis according to the present disclosure may comprise the step of performing at least one wash treatment on the additively manufactured dental device to remove unreacted or residual photopolymerizable polymeric composition from surfaces of the additively manufactured dental device. A wash treatment may be performed by immersing the additively manufactured dental device in a polar solvent composition. The polar solvent composition may be comprised of a substantially pure solvent species, or a mixture of solvent species. In a preferred embodiment, the polar solvent composition may comprise a $C_1$-$C_3$ alcohol, such as isopropanol. A wash treatment period need not be particularly limited, but rather may be performed for a period of time sufficient to substantially remove unreacted or residual photopolymerizable polymeric composition from surfaces of the additively manufactured dental device. In an embodiment, a single wash treatment period of between about 1 minute to about 15 minutes may be performed. In an alternative embodiment, two or more separate wash treatment periods of between about 1 minute to about 5 minutes each may be performed, wherein the polar solvent composition is refreshed or replaced for each wash treatment period.

Methods of fabricating a dental prosthesis according to the present disclosure may further comprise the step of bonding artificial teeth within the tooth sockets of the additively manufactured dental device. Pre-formed artificial teeth forms may be prepared and/or pre-selected so that the size and shape of the basal surface of each artificial tooth is adapted to be received in a tooth socket of the denture base. Suitable artificial teeth forms are ones where the outer contour, or shape profile, and size corresponds to an appropriate artificial tooth type (i.e., incisor, cuspid/canine, bicuspid/premolar, molar) and/or tooth number (such as used in the FDI World Dental Federation notation system) in relation to the native oral anatomy and location or position along a dental arch. In an embodiment, each artificial tooth may be bonded within the tooth socket compartment by at least one bonding agent. Numerous tooth adhesives or bonding agent(s) used to bond artificial teeth to a denture base are commercially available. These generally consist of acrylic-based monomers and/or prepolymers that are cured via either redox, heat or visible light polymerization techniques. At least one bonding agent may be either applied to the tooth socket, applied to the tooth surface, or applied to both just prior to insertion of the tooth. The tooth may be inserted into the tooth socket, and then heat and/or light may be applied (typically in a localized or directed manner about the tooth socket) to complete the bonding process. The bonding agent(s) forms a bond between the tooth surface and denture base. In combination with the bonding agent(s), a tooth pretreatment can also be employed where a special bonding agent that includes a combination of solvent and monomer swells the tooth surface. This provides for an additional surface bonding layer and together can improve the overall bond strength. The viscosity, shade and pigmentation of these adhesives or bonding agent(s) may vary, and may be selected or modified as needed to suit the given material selections of denture base and artificial teeth, and/or other patient-specific needs.

Methods of fabricating a dental prosthesis according to the present disclosure may further comprise the step of performing a secondary photo-curing treatment on the additively manufactured dental device to substantially complete curing and photopolymerization of the photopolymerized polymeric composition. Although the initial 3D printing (photo-curing) forms the initial solid dental device, this secondary curing treatment may be further beneficial for ensuring complete conversion and cross-linking of the polymeric composition to fully realize the final mechanical properties and biocompatibility profile desired for patient use. In a preferred embodiment, the denture device may be exposed to electromagnetic radiation across wavelengths from about $10^{-8}$ m (10 nanometers) to about $10^{-3}$ m (1 millimeter) for between about 5 minutes to about 15 minutes each on both the tooth socket side and the basal side (underside) of the dental device. Exposure to broad-spectrum electromagnetic radiation in the ultraviolet (UV) and visible wavelength ranges may be particularly preferred. An ECLIPSE® PROCESSING UNIT (Model No. 9494800; 120 Volts, 12 Amps, 1200 Watts; available from Dentsply Sirona, Inc.) is one example of a commercially-available light curing device that may be used to perform a secondary photo-curing treatment such as this.

Because the step of bonding artificial teeth and the step of performing a secondary photo-curing treatment can each create additional thermal and/or physical stresses in the denture base, denture bases lacking at least one removable bracing body according to one or more embodiments of the present disclosure may be more vulnerable and likely to experience significant physical distortion or dimensional changes during these steps. Thus, dental devices of the present disclosure can provide distinct advantages for maintaining the integrity of denture bases during the fabrication of dental prostheses Methods of fabricating a dental prosthesis according to the present disclosure may further comprise the step of separating each removable bracing body from the additively manufactured dental device. Each removable bracing body may be separated at each fixed juncture with the denture base by any suitable physical and/or chemical removal means so as to separate the removable bracing body from the denture base and avoid detrimental effects to the denture base. In an embodiment, suitable physical means may include cutting, abrading, or other similar material severing or eroding techniques, performed at, or proximate to, each fixed juncture with the denture base.

In an embodiment, performing a secondary photo-curing treatment may occur between the step of performing at least one wash treatment on the additively manufactured dental device, and the step of bonding artificial teeth within the tooth sockets of the additively manufactured dental device.

In another embodiment, performing a secondary photo-curing treatment may occur between the step of bonding artificial teeth within the tooth sockets of the additively manufactured dental device, and the step of separating each removable bracing body from the additively manufactured dental device.

The previously described embodiments of the invention provide distinct advantages for additively manufactured dental devices for use in fabricating dental prostheses, and for methods of using these additively manufactured dental devices to fabricate dental prostheses. In particular, additively manufactured dental devices having removal bracing bodies of the present invention provide improved denture base dimensional stability/integrity, particularly during post-print procedural steps of artificial tooth bonding and secondary curing, prior to bracing body removal from the dental prosthesis.

However, it should also be recognized that the present invention does not require that all the preferred or advantageous features, nor all the advantages, need to be incorporated into every embodiment of the invention. Although the present invention has been described in considerable detail with reference to certain preferred versions thereof, other versions are possible within the scope the invention. Therefore, the spirit and scope of the appended claims should not be limited to the description of the preferred versions contained herein. All of the features disclosed in this specification, including any accompanying claims, abstract, and drawings, may be replaced by alternative features serving the same, equivalent, or similar purpose, unless expressly stated otherwise. Thus, unless expressly stated otherwise, each feature disclosed is one example only of a generic series of equivalent or similar features.

What is claimed is:

1. An additively manufactured dental device for use in fabricating a polymeric dental prosthesis, the additively manufactured dental device comprising:
   (a) an additively manufactured polymeric denture base that includes a polymeric dental arch form having:
      i. a buccal-facing side;
      ii. a lingual-facing side; and
      iii. a plurality of polymeric tooth sockets, wherein the plurality of polymeric tooth sockets are disposed along the polymeric dental arch form between the buccal-facing side and lingual-facing side; and
   (b) at least one additively manufactured polymeric removable bracing body, wherein the at least one polymeric removable bracing body is joined to the polymeric denture base at a plurality of locations, such that the at least one polymeric removable bracing body includes:
      i. at least one polymeric fixed juncture with the lingual-facing side of the polymeric dental arch form, proximate to an anterior tooth socket within an anterior portion of the polymeric dental arch form;
      ii. at least one polymeric fixed juncture with the lingual-facing side of the polymeric dental arch form, proximate to a molar tooth socket within a left posterior portion of the polymeric dental arch form; and
      iii. at least one polymeric fixed juncture with the lingual-facing side of the polymeric dental arch form, proximate to a molar tooth socket within a right posterior portion of the polymeric dental arch form;
      wherein each polymeric fixed juncture with the lingual-facing side of the polymeric dental arch form includes a cross-sectional area of at least about 1.5 mm$^2$ and no more than about 20 mm$^2$; and
   (c) at least one additively manufactured removable polymeric support structure extending from the polymeric dental arch form; the at least one removable polymeric support structure being of a smaller cross-section than the at least one polymeric removable bracing body;
   wherein the additively manufactured polymeric denture base, the at least one additively manufactured polymeric removable bracing body, and the at least one additively manufactured removable polymeric support structure are additively manufactured together and removably attached; and
   wherein the additively manufactured polymeric denture base, the at least one additively manufactured polymeric removable bracing body, and the at least one additively manufactured removable polymeric support structure each includes a photopolymerized polymeric composition.

2. The dental device according to claim 1, wherein the polymeric removable bracing body further comprises at least one polymeric fixed juncture with the lingual-facing side of the polymeric dental arch form, proximate to a premolar tooth socket within the left posterior portion of the polymeric dental arch form, and at least one polymeric fixed juncture with the lingual-facing side of the polymeric dental arch form, proximate to a premolar tooth socket within the right posterior portion of the polymeric dental arch form.

3. The dental device according to claim 1, wherein each polymeric fixed juncture with the lingual-facing side of the polymeric dental arch form is located at least about 1 mm, and no more than about 4 mm, below the margin of the tooth socket that the polymeric fixed juncture is proximate to along the lingual-facing side.

4. The dental device of claim 1, wherein each polymeric fixed juncture with the lingual-facing side of the polymeric dental arch form comprises a cross-sectional area of at least about 2 mm$^2$ and no more than about 15 mm$^2$.

5. An additively manufactured dental device for use in fabricating a polymeric dental prosthesis, the additively manufactured dental device comprising:
   (a) an additively manufactured polymeric denture base— that includes a polymeric dental arch form having:
      i. a buccal-facing side;
      ii. a lingual-facing side; and
      iii. a plurality of polymeric tooth sockets, wherein the plurality of polymeric tooth sockets are disposed along the polymeric dental arch form between the buccal-facing side and lingual-facing side;
   (b) a first additively manufactured polymeric removable bracing body, wherein the first polymeric removable bracing body is joined to the polymeric denture base at two or more locations, such that the first polymeric removable bracing body includes:
      i. at least one polymeric fixed juncture with the lingual-facing side of the polymeric dental arch form, proximate to a molar tooth socket within a left posterior portion of the polymeric dental arch form; and
      ii. at least one polymeric fixed juncture with the lingual-facing side of the polymeric dental arch form, proximate to a molar tooth socket within a right posterior portion of the polymeric dental arch form;
      wherein each polymeric fixed juncture with the lingual-facing side of the polymeric dental arch form includes a cross-sectional area of at least about 1.5 mm$^2$ and no more than about 20 mm$^2$;
   (c) a second additively manufactured polymeric removable bracing body, wherein the second polymeric removable bracing body is joined to the polymeric denture base at two or more locations, such that the second polymeric removable bracing body includes:
      i. at least one polymeric fixed juncture with the lingual-facing side of the polymeric dental arch form, proximate to a premolar tooth socket within the left posterior portion of the polymeric dental arch form; and ii. at least one polymeric fixed juncture with the lingual-facing side of the polymeric dental arch form, proximate to a premolar tooth socket within the right posterior portion of the polymeric dental arch form;

wherein each polymeric fixed juncture with the lingual-facing side of the polymeric dental arch form includes a cross-sectional area of at least about 1.5 mm$^2$ and no more than about 20 mm$^2$; and (d) at least one additively manufactured removable polymeric support structure extending from the polymeric dental arch form; the at least one removable polymeric support structure being of a smaller cross-section than the first polymeric removable bracing body and the second polymeric removable bracing body;

wherein the first polymeric removable bracing body is not joined to the second polymeric removable bracing body;

wherein the additively manufactured polymeric denture base, the first additively manufactured polymeric removable bracing body, the second additively manufactured polymeric removable bracing body, and the at least one additively manufactured removable polymeric support structure are additively manufactured together and removably attached; and wherein the additively manufactured polymeric denture base, the first additively manufactured polymeric removable bracing body, the second additively manufactured polymeric removable bracing body, and the at least one additively manufactured removable polymeric support structure each includes a photopolymerized polymeric composition.

6. The dental device according to claim 5, wherein each polymeric fixed juncture with the lingual-facing side of the polymeric dental arch form comprises a cross-sectional area of at least about 2 mm$^2$ and no more than about 15 mm$^2$.

* * * * *